UNITED STATES PATENT OFFICE.

OSCAR DRESSEL AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 843,137.     Specification of Letters Patent.     Patented Feb. 5, 1907.

Application filed November 6, 1906. Serial No. 342,287.

*To all whom it may concern:*

Be it known that we, OSCAR DRESSEL and ANTON OSSENBECK, citizens of the German Empire, residing at Elberfeld, Germany, Kingdom of Prussia, have invented new and useful Improvements in Azo Dyes, of which the following is a specification.

We have found that new and valuable azo dyestuffs are obtained by combining the diazo compounds of non-sulfonated nitro-ortho-aminophenolic compounds with 2-arylamino-5-naphthol-7-sulfonic acids.

The new dyestuffs are in the shape of their alkaline salts dark powders soluble in water and dyeing wool from acid-baths generally from red to violet shades, which on chroming change to from blue to black fast shades. By reduction of the new dyestuffs with stannous chlorid and hydrochloric acid non-sulfonated diaminophenolic compounds and 2-arylamino-5-naphthol-6-amino-7-sulfonic acids are obtained.

In carrying out the new process practically we can proceed as follows, the parts being by weight: 15.4 parts of 4-nitro-2-aminophenol are diazotized in the usual manner by means of hydrochloric acid and seven parts of sodium nitrite. The diazo compound precipitated during the diazotization is filtered off, stirred up with water to a thin paste, and added with stirring to a solution of thirty-two parts of 2-phenylamino-5-naphthol-7-sulfonic acid mixed with an excess of sodium carbonate. The dyestuff is filtered off, pressed, and dried. It is, after being dried and pulverized, in the shape of its sodium salt a dark powder soluble in water with a violet color and in concentrated sulfuric acid with a violet color. By reduction with stannous chlorid and hydrochloric acid 2-4-diaminophenol and 2-phenylamino-5-naphthol-6-amino-7-sulfonic acid is obtained. The new dyestuff dyes wool from acid-baths Bordeaux shades, which are changed to blue-black when chromed after dyeing.

The process is carried out in an analogous manner on using other diazo compounds of non-sulfonated nitro-ortho-aminophenolic compounds or other 2-arylamino-5-naphthol-7-sulfonic acids.

In the following table the properties of some of the new dyestuffs are given:

| Dyestuff obtained from— | | Dyes wool from acid baths— | Dyes wool when chromed after dyeing— |
|---|---|---|---|
| 1. 4-nitro-2-aminophenol. | | Bordeaux. | Blue-black. |
| 2. 5-nitro-2-aminophenol. | + 2-phenyl-amino-5-naphthol-7-sulfonic acid. | Bordeaux. | Greenish blue. |
| 3. Picramic acid. | | Bordeaux. | Blue. |
| 4. 6-nitro-2-amino-4-cresol. | | Bordeaux. | Blue. |
| 5. 4-nitro-2-aminophenol. | + 2-paratolylamino-5-naphthol-7-sulfonic acid. | Bordeaux. | Blue-black. |
| 6. 4-nitro-6-amino-2-cresol. | | Bordeaux. | Violet-black. |
| 7. 5-nitro-2-aminophenol. | + 2-ortho-anisylamino-5-naphthol-7-sulfonic acid. | Bordeaux. | Greenish blue. |
| 8. 6-nitro-2-amino-4-cresol. | | Bordeaux. | Blue. |

Having now described our invention and in what manner the same is to be performed, what we claim as new, and desire to secure by Letters Patent, is—

1. The herein-described new azo dyestuffs obtainable by combining diazo compounds of non-sulfonated nitro-ortho-aminophenolic compounds with 2-arylamino-5-naphthol-7-sulfonic acids, which dyestuffs are, after being dried and pulverized, in the shape of their alkaline salts dark powders soluble in water; yielding upon reduction with stannous chlorid and hydrochloric acid, diaminophenolic compounds and 2-arylamino-5-naphthol-6-amino-7-sulfonic acids and dyeing wool from acid-baths generally from red to violet shades, which on chroming change to from blue to black, substantially as hereinbefore described.

2. The herein-described new azo dyestuffs, which can be obtained by combining diazotized 4-nitro-2-aminophenol with 2-phenylamino-5-naphthol-7-sulfonic acid, which dyestuff is, after being dried and pulverized, in the shape of its sodium salt a dark powder soluble in water with a violet color and in concentrated sulfuric acid with a violet color; yielding upon reduction with stannous chlorid and hydrochloric acid 2-4-diaminophenol and 2-phenylamino-5-naphthol-6-amino-7-sulfonic acid; and dyeing wool from acid-baths Bordeaux shades, which are changed to blue-black when chromed after dyeing, substantially as hereinbefore described.

In testimony whereof we have hereunto set our hands in the presence of two subscribing witnesses.

OSCAR DRESSEL.
ANTON OSSENBECK.

Witnesses:
OTTO KÖNIG,
J. A. RITTERSHAUS.